US008510764B1

(12) United States Patent
Deselaers et al.

(10) Patent No.: US 8,510,764 B1
(45) Date of Patent: Aug. 13, 2013

(54) METHOD AND SYSTEM FOR DEEP LINKS IN APPLICATION CONTEXTS

(71) Applicant: Google Inc., Mountain View, CA (US)

(72) Inventors: Thomas Deselaers, Zurich (CH); Daniel Keysers, Stallikon (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/667,572

(22) Filed: Nov. 2, 2012

(51) Int. Cl.
*G06F 13/00* (2006.01)

(52) U.S. Cl.
USPC .......................................... 719/329

(58) Field of Classification Search
USPC .......................................... 719/329
See application file for complete search history.

(56) References Cited

U.S. PATENT DOCUMENTS

| 8,204,750 | B2 * | 6/2012 | DeWitt | 704/272 |
|---|---|---|---|---|
| 2003/0225890 | A1 * | 12/2003 | Dunstan et al. | 709/227 |
| 2007/0074116 | A1 * | 3/2007 | Thomas | 715/719 |
| 2009/0164903 | A1 * | 6/2009 | Patel | 715/721 |
| 2011/0055713 | A1 * | 3/2011 | Gruenewald et al. | 715/738 |
| 2012/0084252 | A1 * | 4/2012 | Zha et al. | 707/600 |
| 2012/0110318 | A1 * | 5/2012 | Stone | 713/150 |

* cited by examiner

*Primary Examiner* — Andy Ho
(74) *Attorney, Agent, or Firm* — McDonnell Boehnen Hulbert & Berghoff LLP

(57) ABSTRACT

A first application running on an electronic device may receive a first request that was triggered by a second application running on the electronic device. In response to the first request, the first application may provide a token that corresponds to a state of the first application at the time of receiving the first request. In response to receiving—after the state of the first application has changed—a second request that comprises the previously-provided token, the first application may return to the state that it was in at the time of the first request.

20 Claims, 4 Drawing Sheets

METHOD AND SYSTEM FOR DEEP LINKS IN APPLICATION CONTEXTS

TECHNICAL FIELD

Aspects of the present application relate to electronic devices. More specifically, to a method and system for deep links into application contexts.

BACKGROUND

Existing methods and systems for interacting with applications running on an electronic device can be cumbersome and time consuming. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

A method and/or system is provided for deep links into application contexts, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "module" refers to functions than can be performed by one or more circuits. As utilized herein, the terms "e.g.," and "for example" set off lists of one or more non-limiting examples, instances, or illustrations.

Figure 1:
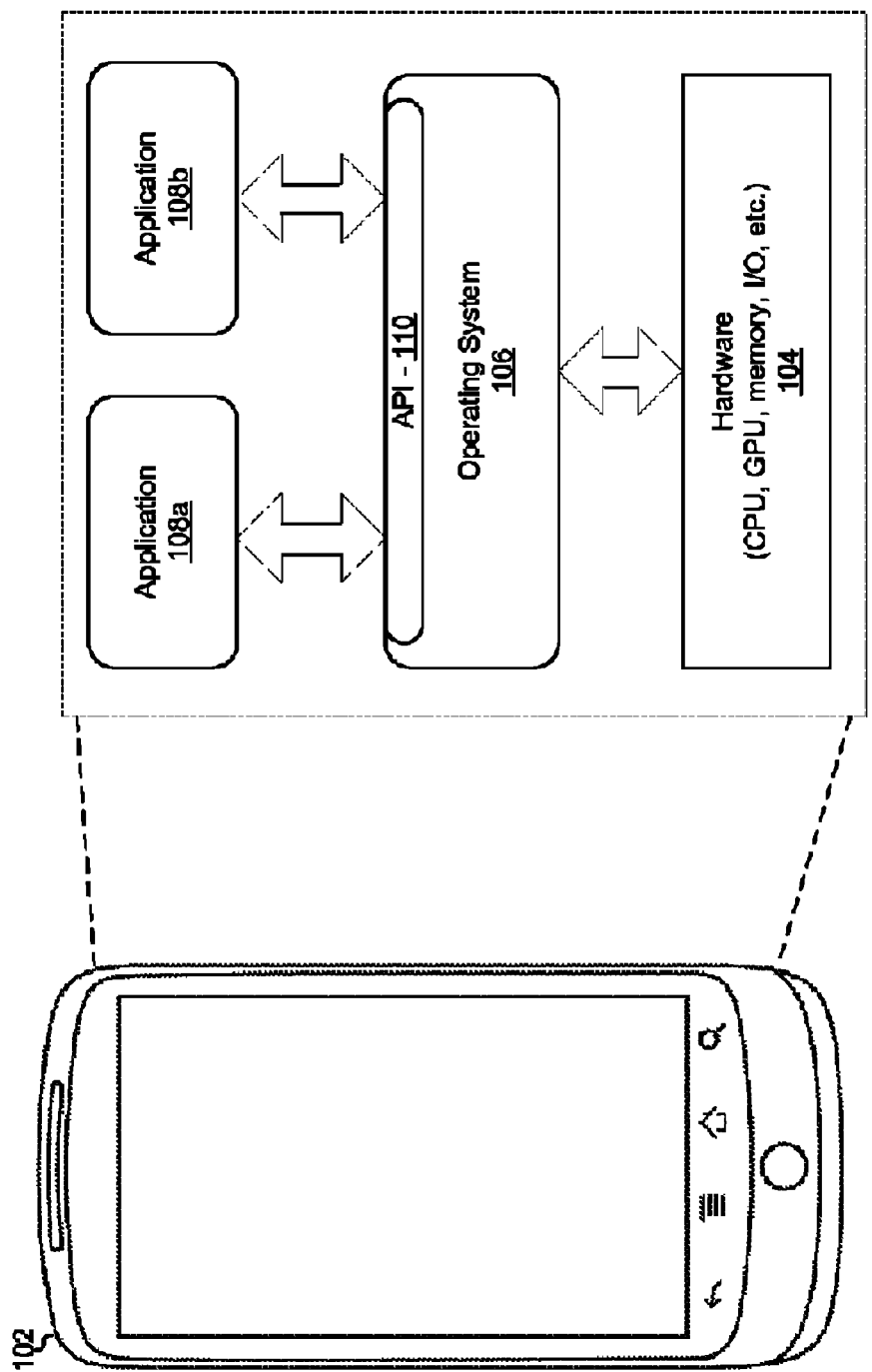
FIG. 1 depicts an example electronic device in accordance with an example implementation of this disclosure.

FIG. 1 depicts an example electronic device in accordance with an example implementation of this disclosure. Referring to FIG. 1, there is shown an example electronic device 102 comprising hardware 104 running an operating system (OS) 106 and applications 108a and 108b. Although the example electronic device 102 is a smartphone, aspects of this disclosure are applicable to other electronic devices such as PCs, laptops, tablet computers, etc.

Each of the applications 108a and 108b may comprise code executed to cause the electronic device 102 to perform specific tasks and/or functions. Each of the applications 108a and 108b may be a native application (i.e., installed by a manufacturer of the electronic device 102 and/or a manufacturer of the OS 106) and/or may be a third-party application installed by a user of the electronic device 102 after purchasing the electronic device. A non-exhaustive list of example applications includes: a media player application that accepts media files as inputs and outputs the corresponding video and/or audio to the output device(s); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a bookmarking application, and a word processing, spreadsheet, and/or presentation application that accepts specifically formatted files as inputs and presents them via the output devices for viewing and/or editing.

The OS 106 may interact with and manage the hardware 104 to provide services for the applications 108a and 108b.

The hardware 104 may comprise, for example, a central processing unit, a graphics processor, memory, an input/output (I/O) interface, user input device(s), and user output device(s).

The central processing unit (CPU) may be operable to effectuate the operation of the electronic device by executing lines of code stored in memory. Such lines of code may include the operating system 106 and the applications 108a and 108b. The controller may, for example, comprise a single or multi-core processor, an application specific integrated circuit (ASIC), field programmable gate array (FPGA), and/or any other suitable circuitry.

The graphics processor may be operable to generate a video stream for output to the screen based on instructions and/or data received from the CPU. That is, data structures corresponding to images to be displayed on the screen may be stored to and read from the memory module by the CPU. The central processing unit may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may comprise program memory and run-time memory. The memory may, for example, comprise non-volatile memory, volatile memory, read only memory (ROM), random access memory (RAM), flash memory, magnetic storage, and/or any other suitable memory. Program memory may store lines of code executable by the CPU to effectuate operation of the OS 106 and the applications 108a and 108b. Runtime memory may store data generated and/or used during execution of the OS 106 and/or applications 108a and 108b.

The input/output (I/O) interface may be operable to receive signals from the input device(s), and provide corresponding signals to the CPU and/or the graphics processor.

The input device(s) may comprise, for example, a mouse, a touchpad, a motion sensor, a trackball, a voice recognition device, a keyboard, and/or any other suitable input device which enables a user to interact with the electronic device 102.

The output devices may comprise, for example, a screen and speakers. The screen may be, for example, a liquid crystal display (LCD) screen, a OLED screen, an e-ink screen, and/or any other suitable device for presenting a graphical user interface.

Figure 2:
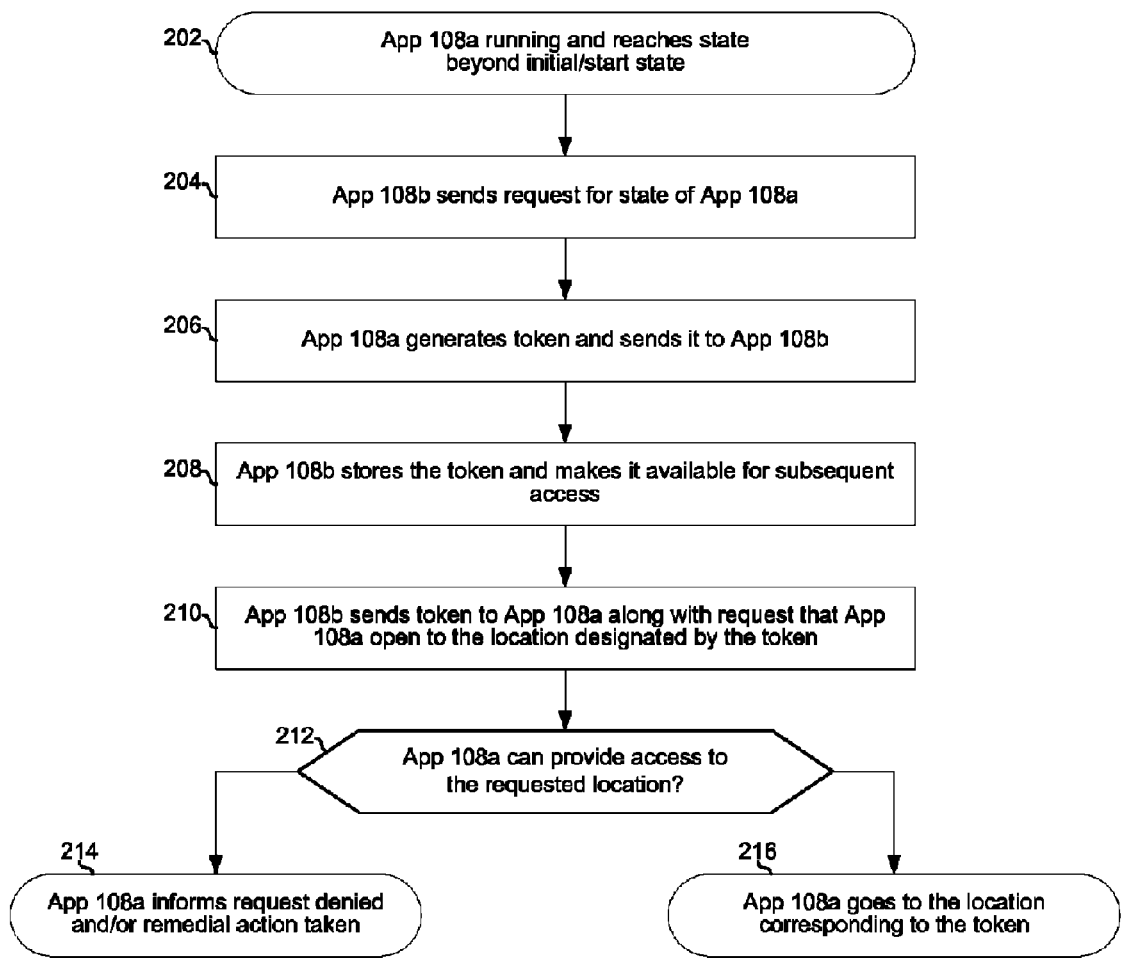
FIG. 2 depicts an example process enabling direct access to a particular state of an application running on an electronic device.

FIG. 2 depicts an example process enabling direct access to a particular state of an application running on an electronic device. The process begins with block 202 in which application 108a is running on the electronic device and, as a result of passage of time and/or user interaction, reaches a state beyond an initial state, where the initial state may be, for example, a "home" screen or a "start here" screen. Some example applications and possible states of those applications are described below. The blocks and ordering of the blocks in FIG. 2 are only one example. Additional and/or different blocks and/or the ordering of blocks may vary in different implementations. The duration of the blocks and/or the amount of time between two consecutive blocks may vary among the blocks shown in FIG. 2.

Example Media Player Application

An initial state of an example media player application launched via a launcher may be one in which, for example, a screen which prompts the user to "select a media file" is presented. Upon the user selecting a media file, the media player application may move to a state in which it presents a screen via which the selected media file can be played by the user pressing "Play." In response to the user pressing "Play," the media file may begin playing and the state of the media player application may continually update as the media file plays (e.g., each frame of a video or audio file may correspond to a different state of the media player application).

Example E-Reader Application

An initial state of an example E-Reader application launched via a launcher may be one in which, for example, a screen prompting the user to "select a book or magazine" is presented. Upon the user selecting a book or magazine, the E-Reader application may move to a state in which it displays the cover page of the book or magazine. The user may then flip through the pages of the book or magazine to reach a particular portion of a particular page. The state of the application may update, for example, each time the user scrolls, flips pages, zooms, highlights, and/or otherwise interacts with the book or magazine.

Example Feed Reading Application

An initial state of an example feed reading application launched via a launcher may be one in which, for example, a screen prompting the user to "select a feed" is presented. Upon the user selecting a feed, the feed reading application may move to a state in which it displays the latest post of a particular feed. The user may then scroll through the posts of the selected feed to reach a particular post of the selected feed. The state of the application may update, for example, each time the user scrolls, expands a post, minimizes a post, deletes a post, highlights, and/or otherwise interacts with the book or magazine in some way. Additionally or alternatively, the state of the application may update as new posts are made to the feed.

Example Video Game Application

An initial state of an example video game application launched via a launcher may be one in which, for example, a screen prompting the user to "select a difficulty" is presented. Upon the user selecting a difficulty, the game may begin and a state of the application may update continually as time passes, as new events occur, and/or as user and/or sensor input is received.

Example Map Application

An initial state of an example map application launched via a launcher may be one in which, for example, a screen displaying the entire United States is presented. The user may then zoom, scroll, add markers, and/or otherwise interact with the map, with each interaction resulting in a new corresponding state of the application.

Example Email Application

An initial state of an example email application launched via a launcher may be one in which, for example, an inbox is presented. The user may then select an email and the state of the application may update to one in which the contents of the selected email is displayed. Alternatively the user may search for emails and the state of the application may update to one in which emails meeting the search requirements are listed. Generally speaking, the state of the email application may change in response to user inputs, events (such as receipt of new email), and/or the passage of time.

Example Word Processing Application

An initial state of an example word processing application launched via a launcher may be one in which, for example, a screen prompting the user to "select a document" is presented. Upon the user selecting a document, the word processing application may move to a state in which it displays the beginning of the document. The user may then scroll through the document, edit the document, highlight portions of the document, zoom in or out, and/or otherwise interact with the document. The state of the application may update in response to one or more of the interactions (e.g., all interactions, predetermined interactions, and/or a user-selected subset of interactions).

Still referring to FIG. 2, in block 204 the application 108b sends a request for a token corresponding to the current state of the application 108a.

In block 206, the application 108a generates the requested token and sends, or makes it available, to the application 108b. For example, the token may be written to a designated memory address that the application 108b can then read. The token may comprise, for example, an alphanumeric string generated via, for example, a look-up table and/or an algorithm for converting various parameters and/or context information associated with a state into a token.

In block 208, the application 108b stores the token such that it can be later accessed by the application 108b, another application, and/or by a user of the electronic device 102. For example, the application 108b may be a note-taking application and may store the token as text in the note and/or may store a hyperlink in the note that points to the stored token. As another example, the application 108b may be a bookmarking application that stores the token, URL of websites, and/or other tokens or links for quick access to information.

In block 210, the application 108b sends the token to the application 108a along with a request that the application return to the state corresponding to the token. If the application is not running, the sending of the token may cause the application 108a to be launched. Block 210 may occur at any time while the token is still stored in memory. For example, after block 208, a user may set down the device, or even turn it off, and return to it minutes, hours, or even months later. As long as the token is still stored, the process may resume at block 210.

In block 212, it is determined whether it is possible for the application 108a to return to the state corresponding to the token. If the state is not directly accessible, the process advances to block 214.

In block 214, the application 108a may present a screen or window that the state is not directly accessible using the token. The state may not be accessible because, for example, the state is a secured state and the requisite security credentials have not been presented. Similarly, the state may not be directly accessible because, for example, the state depends on user input that has expired and needs to be re-entered.

In some instances, in addition to (or as an alternative to), indicating that the state is not directly accessible, the application 108a may present a screen or window via which needed security credentials and/or other user input can be provided. This screen or window may, for example, accept input that, in originally reaching the state corresponding to the token, was input over the course of multiples screens or windows. In this manner, the state may be reached more quickly after using the token than it was when starting at the initial state of the application.

Returning to block 212, if the state is directly accessible, the process advances to block 216.

In block 216, the application 108a goes to the state that it was in when the token was generated in block 206. Where the application 108a was launched in block 210, then the application 108a effectively launches directly to the state corresponding to the token and skips the initial state and any intermediate states between the initial state and the state corresponding to the token.

Figure 3:
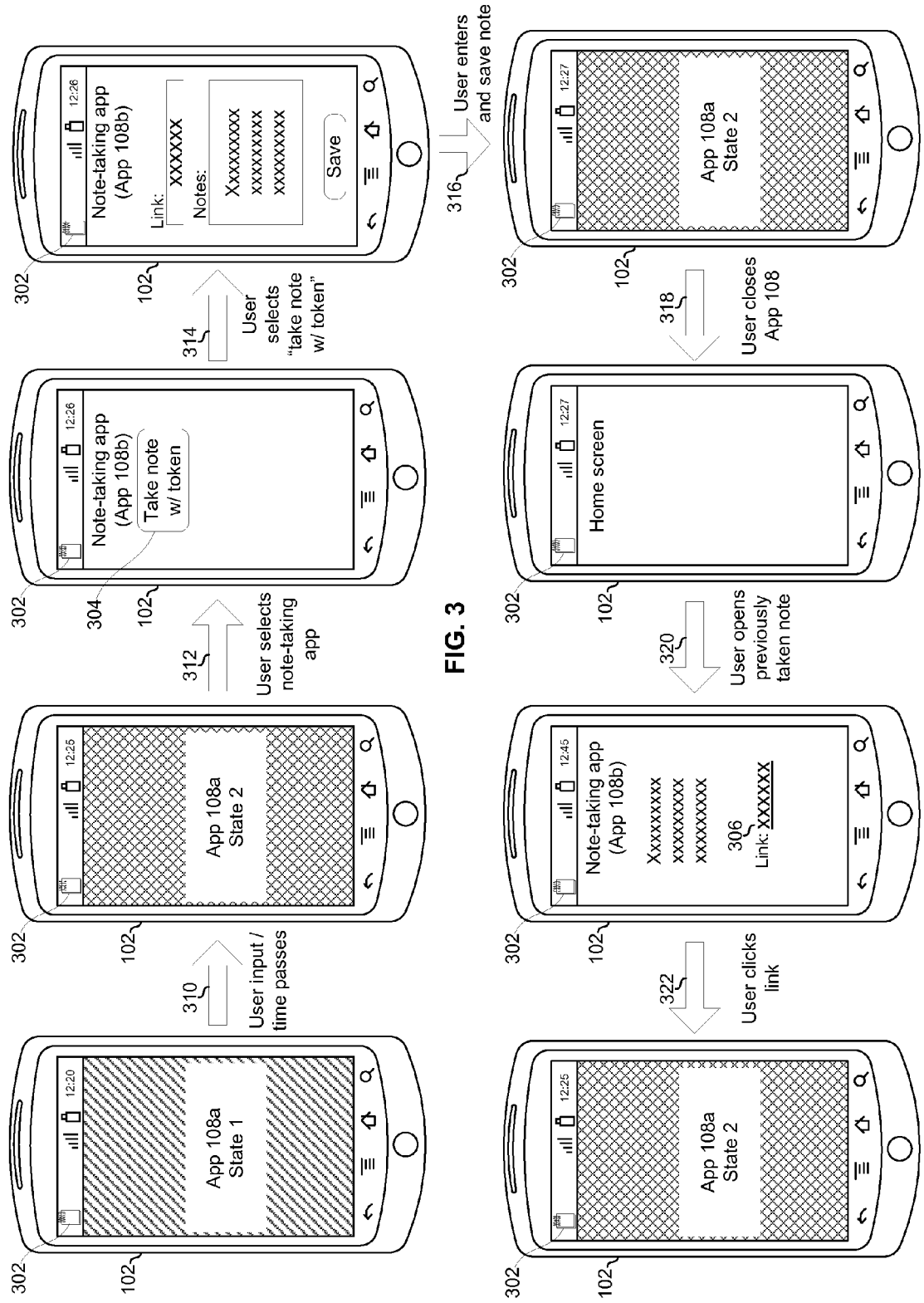
FIG. 3 depicts an example process enabling direct access to a particular state of an application running on an electronic device.

FIG. 3 depicts an example process enabling direct access to a particular state of an application running on an electronic device. In FIG. 3 application 108a is running on the device 102 and is initially in a first state referred to as "state 1" for illustration. In the notification area of the electronic device 102 is an icon 302 for application 108b. As a result of the passage of time and/or user input, represented by arrow 310, the application 108a goes to a second state referred to as "state 2" for illustration.

While application 108a is in state 2, a user of the electronic device touches the icon 302, represented by arrow 312, to bring up the application 108b. The window of application 108b comes up while the application 108a continues to run.

In the displayed screen of the application 108b is a user control that, when selected, triggers a request from the application 108b to the application 108a for a token corresponding to the current state of application 108a. In response to the user interacting with (e.g., clicking or touching) the control, as represented by arrow 314, the request is sent, the application 108a generates and sends the requested token, and the application 108b receives and stores the token. The token, or a link or pointer to the token, may be displayed in the window of the application 108b. The link or pointer may be, for example, the name of the application 108a and/or a timestamp of when the token was generated. In some instances, a text field via which a user can enter notes about the token or the state of the application 108a corresponding to the token may also be displayed. For example, where the application 108a is a media player application, the user may enter a note such as "this is the best part of the song!" As another example, where the application 108a is an E-Reader application, the user may enter a note such as "This paragraph summarizes the author's key argument." In response to the user entering the note and clicking "save," as represented by arrow 316, the application 108b may close or return to running in the background.

The user then closes the application 108a, as represented by arrow 318, and then (perhaps immediately or perhaps weeks later, for example) opens up the note that was taken (during arrow 316). The note comprises the text that was entered and a link that points to the stored token. The user then interacts (e.g., clicks or touches) with the link, as represented by the arrow 322. In response, the application 108a opens up and proceeds directly to state 2 (i.e., skipping state 1 and any other intermediate states), without the user interactions and/or time passage, represented by arrow 310, that were previously required to move from state 1 to state 2.

Figure 4:
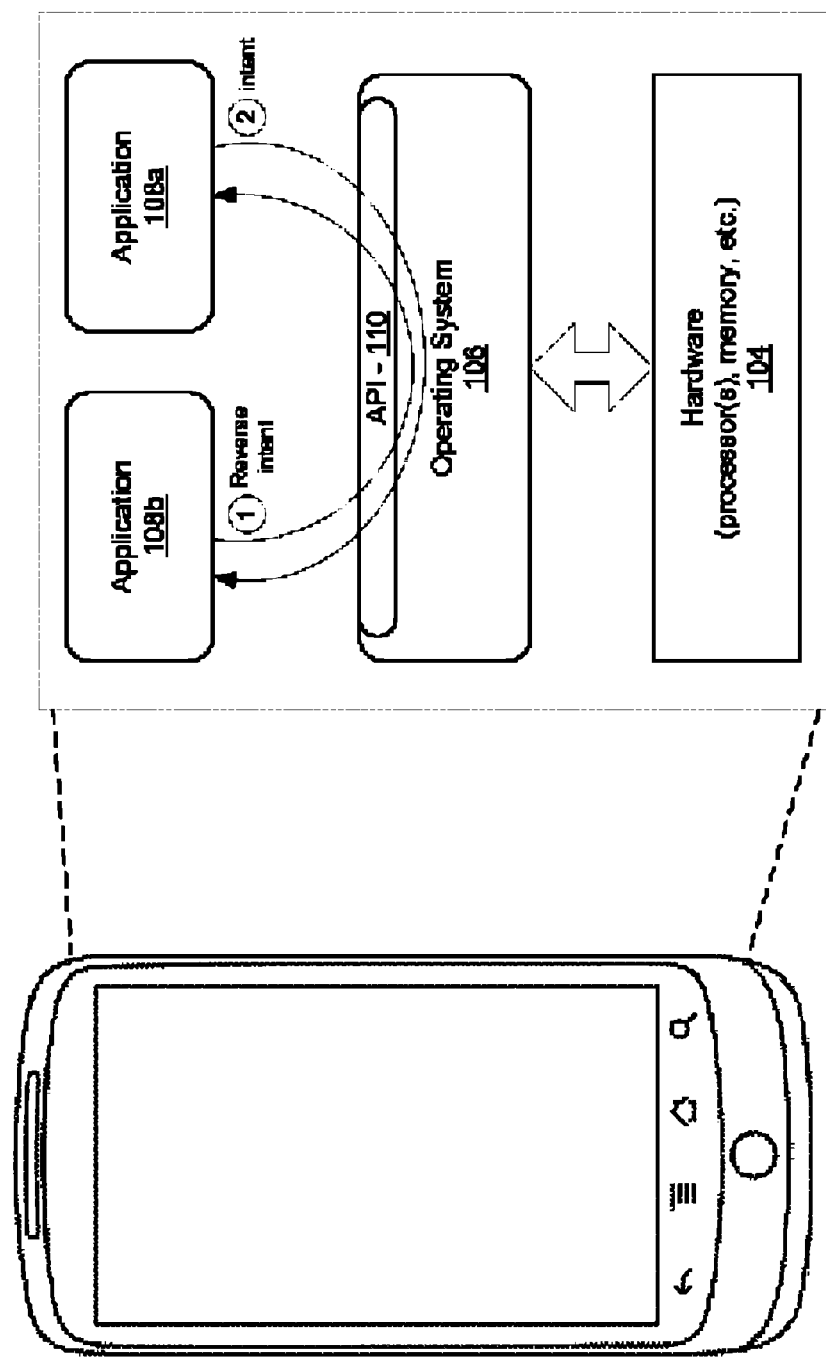
FIG. 4 depicts an example method of sharing application state/location information between applications running on an electronic device.

FIG. 4 depicts an example method of sharing application state/location information between applications running on an electronic device. In the example electronic device 102 shown in FIG. 4, a request for a token from application 108b to application 108a takes the form of a REVERSE_INTENT operation and the response, communicating the token to the application 108a takes the form of an INTENT operation.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the process as described herein for deep links into application contexts.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
  performing by a first application running on an electronic device:
  receiving a first request, the first request being triggered by a second application running on the electronic device;
  in response to the first request, providing a token that corresponds to a state of the first application at the time of receiving the first request, wherein the state of the first application corresponds to information entered by a user over a first number of screens or windows of the first application;
  in response to receiving, after the first application has changed state, a second request comprising the token, generating an interface via which information can be entered by a user over a second number of screens or windows that is less than the first number; and in response to entry of the information over the second number of screens or windows, returning to the state that the first application was in at the time of the first request.

2. The method of claim 1, wherein the first application is a book reader application and the state corresponds to a particular page of a particular book.

3. The method of claim 1, wherein the first application is a video game application.

4. The method of claim 1, wherein the first application is a map application and the state corresponds to a particular view of a particular map.

5. The method of claim 1, wherein the first application is a feed-reader application and the state corresponds to a particular post of a particular feed.

6. The method of claim 1, wherein the information entered over the second number of screens or windows is the same as the information entered over the first number of screens or windows.

7. The method of claim 6, wherein:

the token is stored as a link that, when interacted with by a user, launches the first application;

when launched via the link, the first application launches directly to the state that it was in at the time of the first request; and when launched via a launcher, the first application launches to a state other than the state that it was in at the time of the first request.

8. A method comprising:

performing in smartphone:

while a first application runs on the smartphone, presenting a window of a note-taking application in response to a user interacting with an icon located in a navigation area of the smartphone, the window of the second application comprising a text field;

in response to a user input, generating a link corresponding to a state of the first application at the time of the user input; and storing the generated link along with text entered via the text field such that the link and text can be subsequently accessed by a user of the electronic device.

9. The method of claim 8, comprising:

in response to a user interacting with the link, launching the second application and configuring the second application to the state that it was in at the time the link was generated.

10. The method of claim 8, wherein the first application is a book reader application and the state of the first application corresponds to a particular page of a particular book.

11. The method of claim 8, wherein the first application is a media player application and the state of the first application corresponds to particular time point of a particular media file.

12. The method of claim 8, wherein the first application is a map application and the state of the first application corresponds to particular view of a particular map.

13. The method of claim 8, wherein the first application is a feed-reader application and the state of the first application corresponds to particular post of a particular feed.

14. A system comprising:

an electronic device comprising a first application and a second application wherein:

the first application is operable to receive a first request triggered by the second application;

in response to the first request, the first application is operable to provide a token that corresponds to a state of the first application at the time of receiving the first request wherein the state of the first application corresponds to information entered by a user over a first number of screens or windows of the first application;

in response to receiving, after the first application has changed state, a second request comprising the token, generating an interface via which information can be entered over a second number of screens or windows that is less than the first number; and in response to entry of the information over the second number of screens or windows, the first application is operable to return to the state that the first application was in at the time of the first request.

15. The system of claim 14, wherein the first application is a book reader application and the state corresponds to a particular page of a particular book.

16. The system of claim 14, wherein the first application is a media player application and the state corresponds to a particular time point of a particular media file.

17. The system of claim 14, wherein the first application is a map application and the state corresponds to a particular view of a particular map.

18. The system of claim 14, wherein the first application is a feed-reader application and the state corresponds to a particular post of a particular feed.

19. The system of claim 14, wherein the second application is a note-taking application that stores the token along with user-entered notes pertaining to the state of the application at the time of the first request.

20. The system of claim 19, wherein:

the token is stored as a link that, when interacted with by a user, launches the first application;

when launched via the link, the first application launches directly to the state that it was in at the time of the first request; and when launched via a launcher, the first application launches to a state other than the state that it was in at the time of the first request.

* * * * *